US011314311B2

(12) United States Patent
Iyer et al.

(10) Patent No.: US 11,314,311 B2
(45) Date of Patent: Apr. 26, 2022

(54) BATTERY RUNTIME AND PERFORMANCE MANAGEMENT BASED UPON PRESENCE DETECTION

(71) Applicant: Dell Products, L.P., Round Rock, TX (US)

(72) Inventors: Vivek Viswanathan Iyer, Austin, TX (US); Richard C. Thompson, Cedar Park, TX (US); Nikhil Manohar Vichare, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 354 days.

(21) Appl. No.: 16/577,975

(22) Filed: Sep. 20, 2019

(65) Prior Publication Data
US 2021/0089108 A1 Mar. 25, 2021

(51) Int. Cl.
G06F 1/3231 (2019.01)
G06F 1/3212 (2019.01)
G06V 40/10 (2022.01)

(52) U.S. Cl.
CPC .......... *G06F 1/3231* (2013.01); *G06F 1/3212* (2013.01); *G06V 40/10* (2022.01)

(58) Field of Classification Search
CPC ........ G06F 1/3231; G06F 1/3212; G06F 1/30; G06F 1/28; G06F 1/263
See application file for complete search history.

(56) References Cited

U.S. PATENT DOCUMENTS

| 8,479,024 | B2 | 7/2013 | Vichare et al. |
| 9,197,092 | B2 | 11/2015 | Verdun et al. |
| 9,263,912 | B2 | 2/2016 | Verdun et al. |
| 9,831,700 | B2 | 11/2017 | Verdun et al. |
| 9,887,151 | B2* | 2/2018 | Sato ..................... H01L 29/7397 |
| 10,476,288 | B2* | 11/2019 | Sultenfuss ............ H02J 7/0047 |
| 10,496,509 | B2* | 12/2019 | Thompson .......... G06F 11/3058 |
| 10,673,271 | B2* | 6/2020 | Krishnakumar ........ G06F 1/266 |
| 10,928,880 | B2* | 2/2021 | Sultenfuss .............. G06F 1/206 |
| 10,996,726 | B1* | 5/2021 | Thompson ................ G06F 1/26 |
| 11,086,380 | B2* | 8/2021 | Iyer ......................... G06F 1/329 |
| 2003/0051179 | A1* | 3/2003 | Tsirkel .................. G06F 1/3203 713/300 |
| 2013/0127619 | A1* | 5/2013 | Konishi ................. G08B 21/22 340/540 |
| 2015/0220131 | A1* | 8/2015 | Johansson ............ G06F 1/3287 713/323 |

(Continued)

OTHER PUBLICATIONS

Microsoft, "Power Management Functions," 10 pages, retrieved Jul. 10, 2019, available at https://docs.microsoft.com/en-us/windows/desktop/power/power-management-functions.

*Primary Examiner* — Raymond N Phan
(74) *Attorney, Agent, or Firm* — Fogarty LLP

(57) ABSTRACT

Systems and methods for managing battery runtime and performance based upon presence detection are described. In some embodiments, a method may include: receiving a first amount of energy from a power source directed to supporting operation of an Information Handling System (IHS); receiving a second amount of energy from the power source directed to charging a battery of the IHS; determining a user's presence state with respect to the IHS; and modifying the first and second amounts in response to the presence state.

18 Claims, 10 Drawing Sheets

(56) References Cited

U.S. PATENT DOCUMENTS

| | | | |
|---|---|---|---|
| 2016/0018870 A1* | 1/2016 | Arora | G06F 1/3231 |
| | | | 713/340 |
| 2016/0116960 A1* | 4/2016 | Kwak | G06F 1/3206 |
| | | | 713/323 |
| 2018/0157376 A1* | 6/2018 | Lemarchand | G01S 17/58 |
| 2019/0196576 A1 | 6/2019 | Grobelny et al. | |
| 2020/0133358 A1* | 4/2020 | Mishra | G06K 9/00362 |

* cited by examiner

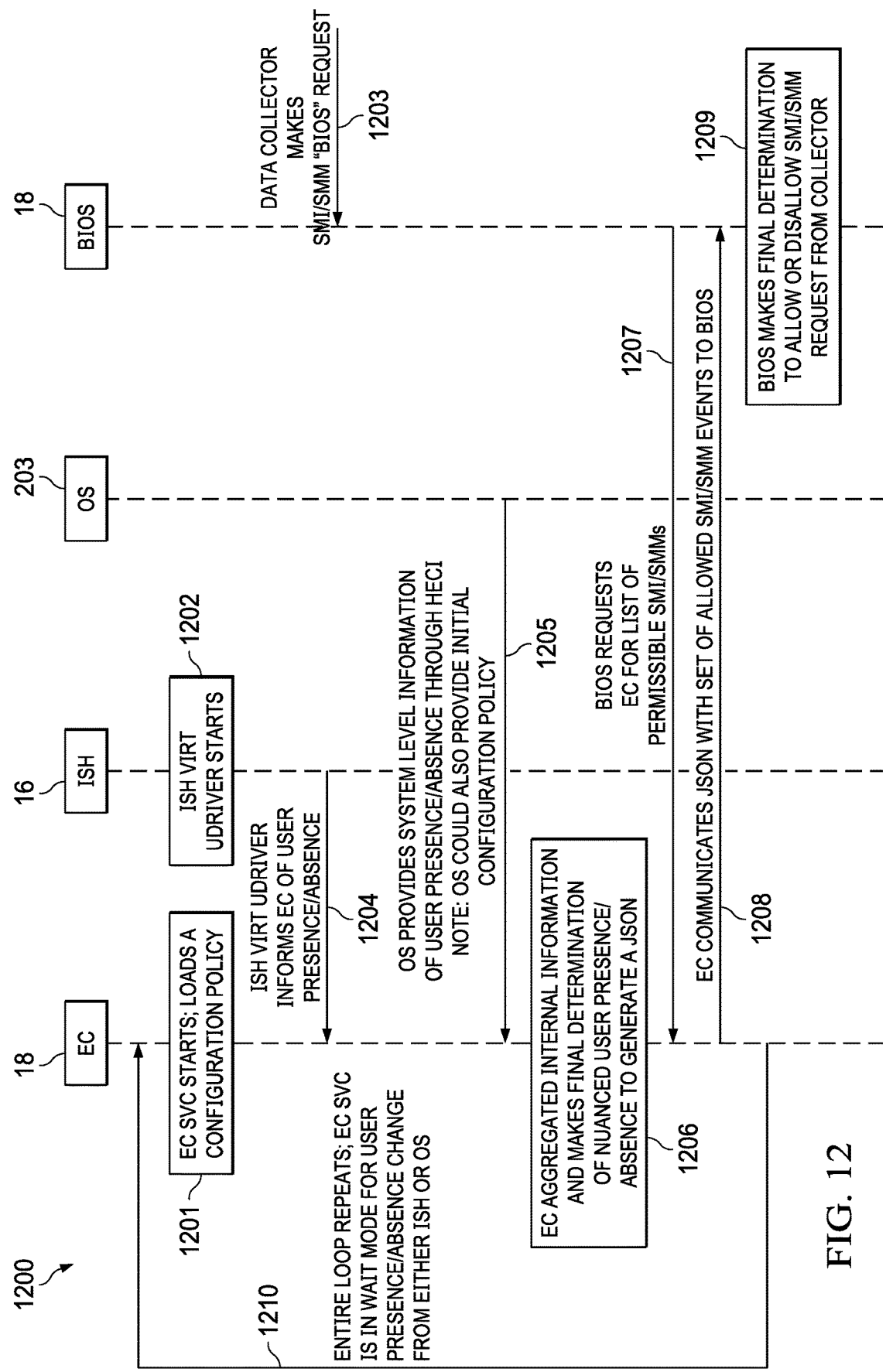

BATTERY RUNTIME AND PERFORMANCE MANAGEMENT BASED UPON PRESENCE DETECTION

FIELD

The present disclosure relates generally to Information Handling Systems (IHSs), and more particularly, to systems and methods for managing battery runtime and performance based upon presence detection.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Examples of portable (IHSs) include notebook computers, tablet components, mobile phones, and personal data assistants (PDAs). Portable IHSs are typically powered by an external alternating current (AC) power source supplied by an AC adapter when connected to an AC power source (i.e., when the system is "plugged in") and by rechargeable batteries (e.g., lithium ion or nickel metal hydride battery packs) when disconnected from the AC power source (i.e., when the system is "unplugged" or in "mobile use"). In some cases, a portable IHS may also receive power supplied via a wired bus (e.g., Universal Serial Bus or "USB" Type-C) or wirelessly via an inductive charging pad.

In various implementations, an IHS's rechargeable battery may be used as a supplemental or dual power source when the IHS is plugged in and connected to another power source. For example, a rechargeable battery may provide supplemental power to a plugged-in IHS when the IHS's processor enters a turbo mode, and/or when an undersized AC adapter, USB-C source, inductive charging pad, or the like is used to support the power consumption of the IHS.

SUMMARY

Systems and methods for managing battery runtime and performance based upon presence detection are described. In an illustrative, non-limiting embodiment, a method may include: receiving a first amount of energy from a power source directed to supporting operation of an Information Handling System (IHS); receiving a second amount of energy from the power source directed to charging a battery of the IHS; determining a user's presence state with respect to the IHS; and modifying the first and second amounts in response to the presence state. For example, the power source may include an alternating current (AC) adapter, a Universal Serial Bus Type-C (USB-C) device, or an induction charging pad.

In some cases, the user's presence state may be selected from the group consisting of: present or absent. When the user is absent, modifying the first and second amounts may include increasing the second amount and decreasing the first amount. The method may also include: reducing a maximum clock speed of a component of the IHS, placing a component of the IHS in standby, turning off a component of the IHS, dimming a component of the IHS, or shutting down an executed application. Conversely, when the user is present, modifying the first and second amounts may include increasing the first amount and decreasing the second amount. The method may also include: increasing a maximum a clock speed of a component of the IHS, removing a component of the IHS from standby, turning on a component of the IHS, or brightening a component of the IHS.

In other cases, the presence state may be selected from the group consisting of: near-field, mid-filed, and far-field. When the user is present, modifying the first and second amounts may include increasing the second amount and decreasing the first amount at a rate proportional to the user's distance from the IHS.

The method may also include: determining that the power source is disconnected; determining a battery runtime to empty charge; and applying a performance throttling profile to the IHS based upon a target battery runtime, where the profile is selected in response to the battery runtime to empty charge. The performance throttling profile may be based upon a type of user, and the performance throttling profile includes different IHS settings selected depending upon whether the user's presence state is determined to be: near-field, mid-field, or far-field.

The method may further include, in response to the user being present with respect to the IHS and a level of the battery dropping below a selected threshold, increasing the second amount and decreasing the first amount at a first rate; and in response to the user being absent with respect to the IHS and the level of the battery dropping below the selected threshold, increasing the second amount and decreasing the first amount at a second rate higher than the first rate.

The method may also include, in response to the user being present with respect to the IHS, setting a rate of data collection from an IHS component at a first rate; and in response to the user being absent with respect to the IHS, setting the rate of data collection at a second rate higher than the first rate. For example, the IHS component may include a Battery Management Unit (BMU) or a Central Processing Unit (CPU).

In another illustrative, non-limiting embodiment, an IHS may include: a processor, and a memory coupled to the processor, the memory having program instructions stored thereon that, upon execution by the processor, cause the IHS to: receive a first amount of energy from a power source directed to supporting operation of the IHS; receive a second amount of energy from the power source directed to charging a battery of the IHS; determine a user's presence state with respect to the IHS; and modify the first and second amounts in response to the presence state.

The program instructions, upon execution by the processor, may also cause the IHS to: determine that the power source is disconnected; determine a battery runtime to empty charge; and apply a performance throttling profile to the IHS based upon a target battery runtime, where the profile is selected in response to the battery runtime to empty charge.

The program instructions, upon execution by the processor, may further cause the IHS to: in response to the user being present with respect to the IHS and a level of the battery dropping below a selected threshold, increase the second amount and decrease the first amount at a first rate; and in response to the user being absent with respect to the IHS and the level of the battery dropping below the selected threshold, increase the second amount and decrease the first amount at a second rate higher than the first rate.

In yet another illustrative, non-limiting embodiment, a memory storage device may have program instructions stored thereon that, upon execution by one or more processors of an IHS to: determine that a battery of the IHS is expected to undergo a charge event; and modify a setting of the IHS to reduce a power consumption of the IHS in anticipation of the charge event. The program instructions, upon execution, may also cause the IHS to: determine that the power source is disconnected; determine a battery runtime to empty charge; and apply a performance throttling profile to the IHS based upon a target battery runtime, where the profile is selected in response to the battery runtime to empty charge.

The program instructions, upon execution, may further cause the IHS to: in response to the user being present with respect to the IHS and a level of the battery dropping below a selected threshold, increase the second amount and decrease the first amount at a first rate; and in response to the user being absent with respect to the IHS and the level of the battery dropping below the selected threshold, increase the second amount and decrease the first amount at a second rate higher than the first rate.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 12 is a diagram illustrating an example of a method for collecting other IHS component data using presence/absence/distance detection, according to some embodiments.

DETAILED DESCRIPTION

Systems and methods described herein may be used for managing battery runtime and performance based upon a user's presence state with respect to an Information Handling System (IHS). As part of a Contextual Battery Management (CBM) system, various techniques described herein may: adaptively optimize an IHS's battery's runtime duration; maximize an IHS's battery charging in alternating current (AC) mode; maximize an amount of time that an IHS's battery has left in direct current (DC) mode; improve an IHS's battery's performance by supporting a power demand that exceeds the capacity of an undersized AC adapter's while monitoring the battery's charge to ensure sufficient reserve energy is maintained to support runtime if the user unplugs the adapter; customize an IHS's battery's charging and discharging policies based on a user profile determination and dynamically change those polic(ies) based upon context; collect Battery Management Unit (BMU) data when the user is absent from the IHS; and/or collect other IHS component data using System Management Interrupts (SMIs) and System Management Mode (SMM) without negatively impacting the user's experience.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
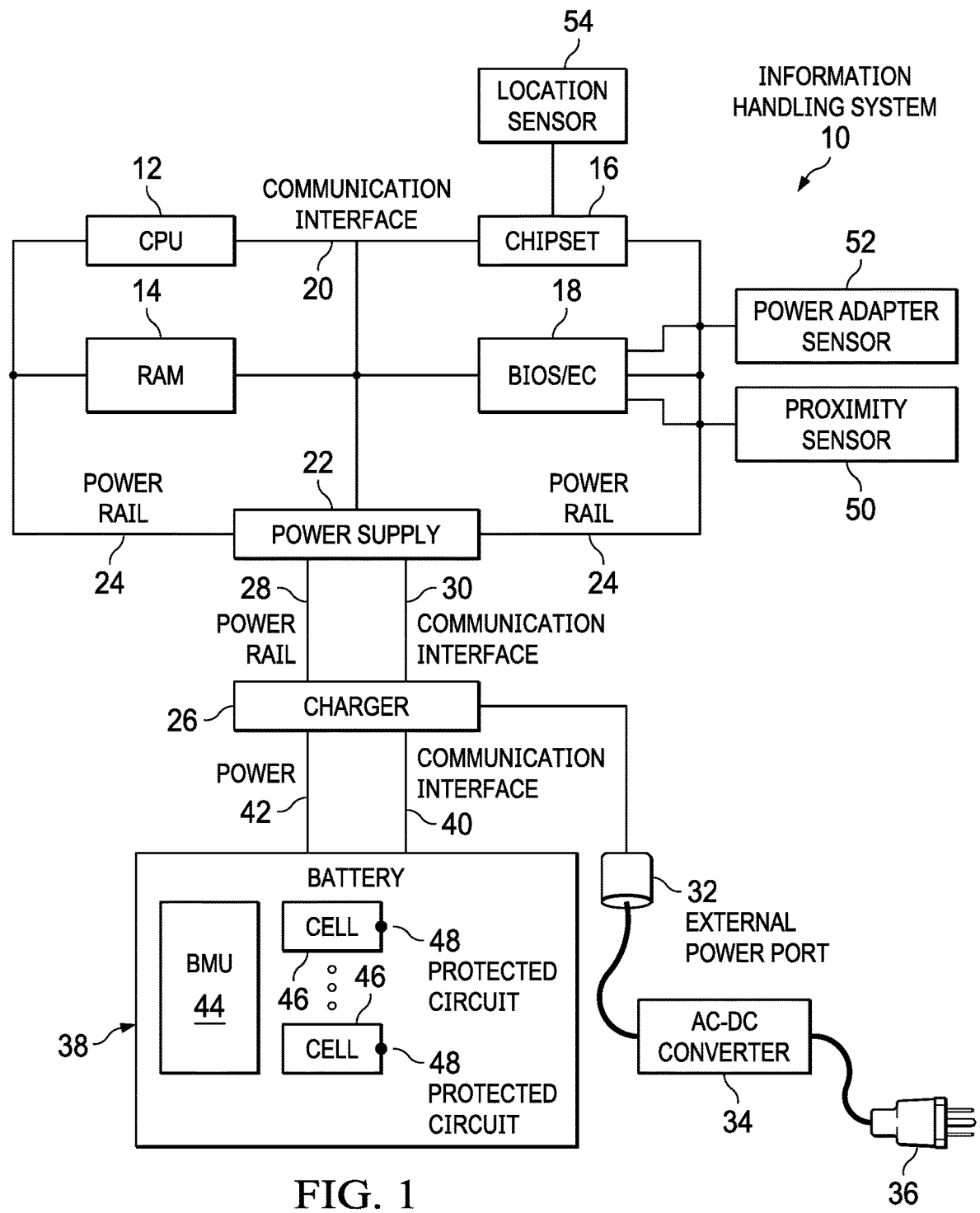
FIG. 1 is a block diagram an example of an Information Handling System (IHS) configured to manage battery runtime and performance based upon presence detection, according to some embodiments.

Referring now to FIG. 1, a block diagram depicts IHS 10 configured to manage battery runtime based upon power source activity. In this example, CPU 12 executes instructions to process information, such as instructions of an OS (e.g., WINDOWS, MACOS, iOS, ANDROID, LINUX, etc.)

or application. Random access memory (RAM) 14 stores the instructions and information, such as after retrieval from persistent storage of a hard disk drive or solid-state drive. Chipset 16 interfaces with CPU 12 to manage CPU operations, such as clock speed and power consumption. As an example, chipset 16 may include a Platform Controller Hub (PCH) that supports a processor turbo mode having increased clock speed and power consumption.

BIOS (Basic Input/Output System)/embedded controller (EC) 18 interface with CPU 12 and chipset 16 to coordinate power use and interactions with other physical components, such as networking, peripheral interfaces, etc. BIOS 18 instruction may be stored in a non-volatile memory accessible by chipset 16 via bus 20. Upon powering or restarting IHS 10, CPU 12 may utilize BIOS 18 instructions to initialize and test hardware components coupled to the IHS 10. BIOS 18 instructions may also load an OS for use by IHS 10.

Communication interface 20 provides communication between CPU 12, RAM 14, chipset 16 and BIOS/EC 18, and may include a variety communications links, such as PCI, PCI Express, I2C, SMBus and other wirelines and pins interfaced through a motherboard. In various embodiments, IHS 10 may include a variety of other hardware components, such as networking components, graphics components, an integrated display, etc.

IHS 10 includes power supply 22 that provides regulated power to processing components through one or more power rails 24. Power supply 22 maintains a selected voltage level on power rails 24 to within defined constraints for the processing components by adjusting current to the processing components as power demands shift. In various embodiments, one or more power supplies may feed current to different power rails that meet the constraints of different processing components, such as different rails that have different voltages.

In some embodiments, chipset 16 may interface with power supply 22 and/or EC 18 to communicate expected CPU processing bursts, such as when CPU 12 enters a turbo boost mode. Generally, proper operation of processing components calls for regulated voltage levels with varying current by IHS power supplies 22.

In this example, charger 26 interfaces with power supply 22 through power rail 28 and communication interface 30 to provide power from external power port 32 and/or internal IHS battery 38. During normal operation, charger 26 accepts power from an external power source, such as an AC-DC converter 34 and alternating current source 36 and provides the external power to power supply 22 to power processing components of IHS 10. Charger 26 uses excess power that is not drawn by power supply 22 to charge battery 38 through power interface 42 supported by a communication interface 40.

For example, battery 38 includes battery management unit (BMU) 44 that manages charge and discharge of individual battery cells 46, such as by metering current to battery cells 46. For instance, BMU 44 may include a controller configured to receive a command that sets a maximum charge current. In some embodiments, battery cells 46 are lithium ion battery cells with a nominal voltage of 3.7V that are coupled in series to operate at multiples of the nominal voltage.

Battery charge and protection are managed as a battery pack with individual battery cells 46 having charge parameters monitored by BMU 44 and battery protection enforced by isolating the battery pack in the event of a failure. In an alternative embodiment, each battery cell 46 has a protection circuit 48 that automatically disconnects the battery cell 46 in the event of a battery over voltage or over current event. As an example, battery 38 may include eight cells 46 configured in series and parallel to operate at a nominal voltage of 14.8V, and AC-DC converter 34 may provide current to charger 26 at the nominal voltage so that charger 26 directs power to battery 38 at the nominal voltage when excess power is available based on power supply 22 draw.

When CPU 12 initiates turbo mode with its associated increase in clock speed and current draw, for example, external power port 32 cannot draw adequate power for power supply 22 to maintain voltage constraints of CPU 12. For instance, external power port 32 may be a USB Type C port that has a 100 W power limit, which is less than the maximum power draw of power supply 22—that is, power port 32 is "undersized" with respect to IHS 10. As another example, AC-DC converter 34 may lack power conversion sufficient to fully supply power supply 22 during peak power consumption—in the case of an "undersized" AC adapter.

As used herein, the term "undersized" adapter or power source refers to an adapter or power source that is not capable of delivering the maximum charging rate to the IHS's internal battery under a given usage scenario. Generally, AC adapters and power sources come in all sizes and ratings (e.g., travel adapters, dock adapters, conference room adapters, etc.). Even with the default IHS's AC adapter (i.e., the power adapter that the IHS ships with), however, fast battery charging is not guaranteed unless the IHS is turned off because default adapters cannot run an IHS in performance mode and fast charge the battery simultaneously. In various embodiments, an "undersized" adapter or power source is one that is not large enough to allow the IHS's free running and fast battery charge at the same time—or any usage scenario where the battery is not receiving its maximum charge rate.

In order to operate the processing components during peak power draw, power supply 22 simultaneously draws power from both external power port 32 and battery 38, such as with Dynamic Battery Power Technology (DBPT). When power supply 22 draws the maximum power available for external power port 32, battery 38 is allowed to discharge so that the combined power available from battery 38 and external power port 32 will meet the power demands of power supply 22. Again, in some cases, chipset 16 provides a signal to charger 26, power supply 22, and/or EC 18 to indicate that turbo mode is active.

As illustrated, chipset 16 may utilize a sensor hub or the like (e.g., an Integrated Sensor Hub or "ISH") capable of sampling and/or collecting data from a variety of sensors. For instance, such a sensor hub may utilize location sensor(s) 54, including global positioning system (GPS), wireless networking (e.g., WiFi, Bluetooth, etc.) sensors, or other radio frequency (RF) sensors (e.g., configured to detect RFID tags), that may be configured to provide an indication of an IHS's physical location.

In some cases, location sensor 54 may be configured to determine the position of IHS 10 with respect to a specific one of a plurality of buildings, offices, cubicles, desks, hallways, corridors, cafeterias, or conference rooms. Additionally, or alternatively, location sensor 54 may be configured to determine the position of IHS 10 with respect to a specific one of a plurality of retail establishments, vehicles, airports, airplanes, train stations, or trains.

As illustrated, IHS 10 may utilize embedded controller (EC) 18 that may be a motherboard component of IHS 100 and may include one or more logic units. EC 18 may interface with BMU 44, and it may control maximum clock values, power states (p-state) manager for CPU, GPUs etc. through PECI (processor-to-EC) interface in run-time after initial settings are received from the BIOS (e.g., at boot up).

EC 18 may implement operations for managing power for IHS 10. These operations may be utilized to determine the power status of IHS 10, such as whether IHS 10 is operating from battery power or is plugged into an AC power source (e.g., whether the IHS is operating in AC-only mode, DC-only mode, or AC-plus-DC mode).

Moreover, EC 18 may utilize proximity sensor(s) 50, including optical, infrared, and sonar sensors, that may be configured to provide an indication of a user's presence near IHS 100, absence from IHS 100, and/or physical distance from IHS 100 (e.g., near-field, mid-field, or far-field).

EC 18 may also implement operations for interfacing with power adaptor sensor 52 in managing power for IHS 10. These operations may be utilized to determine the power status of IHS 10, such as whether IHS 10 is operating from battery power or is plugged into an AC power source (e.g., whether the IHS is operating in AC-only mode, DC-only mode, or AC+DC mode). In some embodiments, EC 18 and chipset 16 may communicate with each other, for example, to exchange sensed data, via an out-of-band signaling pathway or bus.

In some cases, adapter 34 may provide output rating information. For example, in legacy barrel adapters, IHS 10 may use the adapter's PSID and a look-up table (LUT) to determine the adapter's ratings. In other examples, an USB-PD controller may negotiate a power delivery contact with IHS 10.

In various embodiments, IHS 10 may not include each of the components shown in FIG. 1. Additionally, or alternatively, IHS 10 may include various other components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
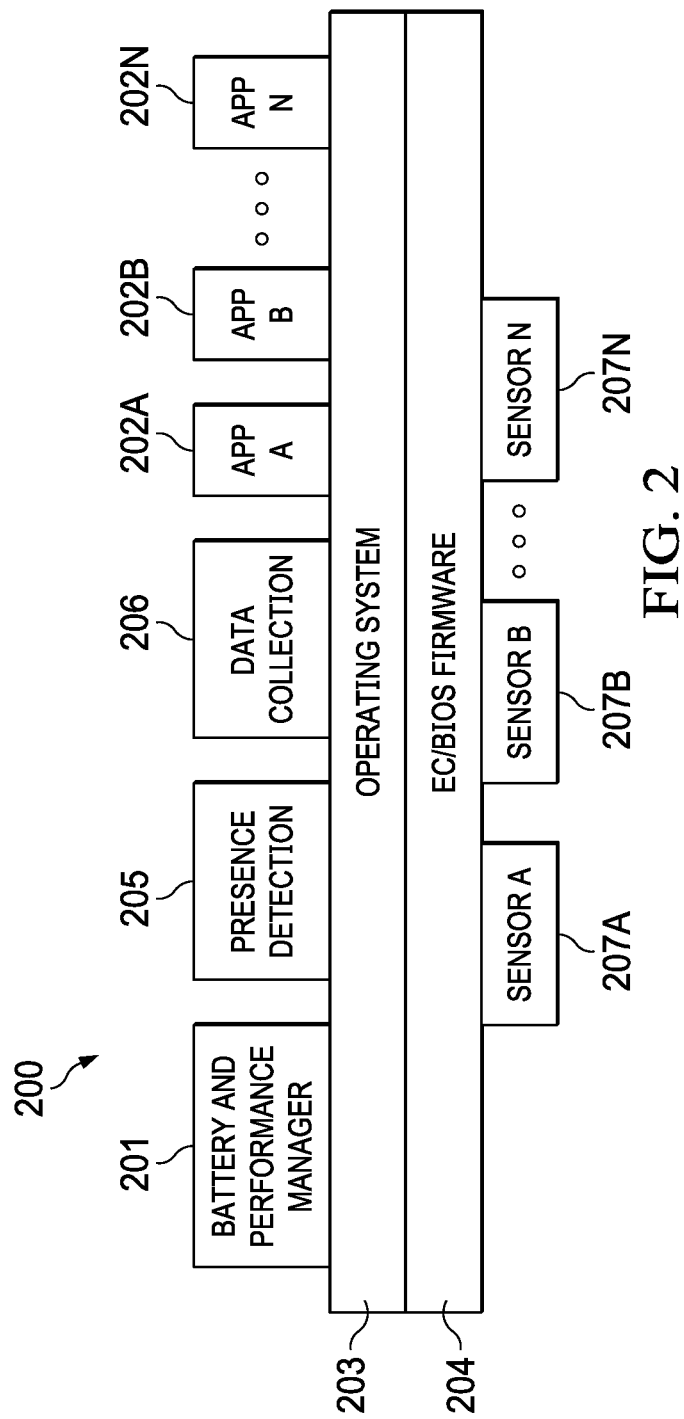
FIG. 2 is a block diagram illustrating an example of a software environment produced by an IHS for managing battery runtime and performance based upon presence detection, according to some embodiments.

FIG. 2 is a block diagram illustrating an example of software environment 200 produced by IHS 10 for managing battery runtime and performance based upon presence detection. In some embodiments, each element of software environment 200 may be provided by IHS 10 through the execution of program instructions by one or more logic components such as, for example, CPU 12 or EC 18, stored in memory (e.g., RAM 14), storage device(s), and/or firmware.

As shown, software environment 200 includes battery and performance manager 201 configured to manage battery runtime during execution of applications 202A-N using data received from presence detection module 205 and data collection engine 206. In various implementations, battery and performance manager 201 may implement one or more of: a method for increasing or maximizing battery charging based upon presence detection, a method for reducing or minimizing battery discharging based upon presence detection, a method for reducing or minimizing battery discharging subject to undersized power adapters based upon presence detection, a method for user profile detection, a method for applying a runtime extension policy involving presence detection, a method for collecting BMU data using presence detection, or a method for collecting other IHS component (e.g., CPU) data using presence detection.

Examples of applications 202A-N include, but are not limited to, computing resource-intensive applications such as ADOBE ILLUSTRATOR, ADOBE AFTER EFFECTS, ADOBE MEDIA ENCODER, ADOBE PHOTOSHOP, ADOBE PREMIER PRO, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

Both battery and performance manager 201 and applications 202A-N may be executed by OS 203, which is in turn supported by EC/BIOS instructions or firmware 204. EC/BIOS firmware 204 is in communications with, and configured to receive data collected by, sensor modules or drivers 207A-N—which may abstract and/or interface with proximity sensor(s) 50, power adapter sensor(s) 52, and/or location sensor(s) 54, for example. In other cases, however, battery and performance manager 201 may be integrated into EC 18. In various embodiments, software environment 200 also includes presence detection module or application programming interface (API) 205 and data collection module or API 206 executed above OS 203.

In some implementations, presence detection module 205 may process user presence data received by one or more of sensor modules 207A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field (user's position<threshold distance A), mid-field (threshold distance A<user's position<threshold distance B, where B>A), or far-field (user's position>threshold distance C, where C>B).

In some cases, battery and performance manager 201 may receive IHS context information using sensors 207A-N including one or more of, for example: user's presence state (e.g., present, near-field, mid-field, far-field, absent), lid state (e.g., of laptop), hinge angle (e.g., between a display portion and a keyboard portion of the IHS), IHS movement (e.g. from an accelerometer or gyroscopic sensor), software application(s) under execution, and meeting/conference information obtained from a calendaring application executed by the IHS. Examples of meeting or conference information include, but are not limited to: a duration, a location, and/or the IHS's user's role (e.g., participant, presenter, manager, executive, etc.). Moreover, battery and performance manager 201 may be configured to manage battery runtime and performance based upon (e.g., proportionally or in response to changes to) this and other contextual information.

Data collection engine 206 may include any data collection service or process, such as, for example, the DELL DATA VAULT configured as a part of the DELL SUPPORT CENTER that collects information on system health, performance, and environment. In some cases, data collection engine 206 may receive and maintain a database or table that includes information related to IHS hardware utilization (e.g., by application, by thread, by hardware resource, etc.), power source (e.g., AC-plus-DC, AC-only, or DC-only), IHS location (e.g., GPS coordinates, wireless access point, RFID tags, etc.), and the like.

As part of CBM, an important use-case involves maximizing battery charging when the IHS is operating in AC mode, whether in Fast Charge or Regular Charge mode, but while the IHS is not operating in performance mode. In general, in a mobile IHS operating in AC mode, the IHS's internal battery receives a leftover charge (LC) such that: LC=Adapter Capability (ADC)−System Power Used (SPU). SPU changes by the second and it is a function of the power consumed by the IHS's CPU, GPU, and various other components.

Accordingly, it is important to maximize the battery metric (e.g., AC charge time) when the user is determined to be absent from a mobile IHS, such that performance and responsiveness for a present user does not take the backseat with respect to battery charging.

In various embodiments, systems and methods described herein may increase or maximize battery charging based upon presence/absence/distance detection. A software service running on the IHS's EC may use ISH absence detection (along with other ISH information) to contextually maximize battery charging in AC mode by throttling CPU, GPU to lower p-states, leveraging other existing throttling mechanisms such as storage power management, etc., to contextually trade off responsiveness and performance for maximum battery charging when user is absent (i.e., by reducing SPU to maximize LC), or farther away from the IHS.

In an embodiment, a software service may implement a configuration policy that takes user presence or absence states as a binary input and maximizes battery charging as a binary output. In other implementations, maximum clock values or power levels for various IHS components may be selected in response to the user's physical distance from the IHS in a discrete (e.g., near, mid, or far-field) or continuous (e.g., inversely proportional to distance) fashion as part of a CBM engine. An alternative embodiment may include an OS service that reads context a software development kit's (SDK) output to determine user presence, then applies one of the IHS's OS modes for throttling etc. using OS application programming interfaces (APIs) to maximize battery charging in AC mode when user is absent (e.g., using a configuration policy) and/or far away.

As such, these systems and methods may adaptively switch between performance mode (responsiveness, latency, raw throughput performance, etc.) and power mode (faster charging) in AC mode based on the user being contextually absent (or present but farther away) from the IHS. In some implementations, these systems and methods may also incorporate machine learning elements. A software service may perform real-time inferences on learned data of past usage (ML-PAU), which may be stored as a machine learning (ML) or artificial intelligence (AI) model on the IHS itself or on the cloud.

Figure 3:
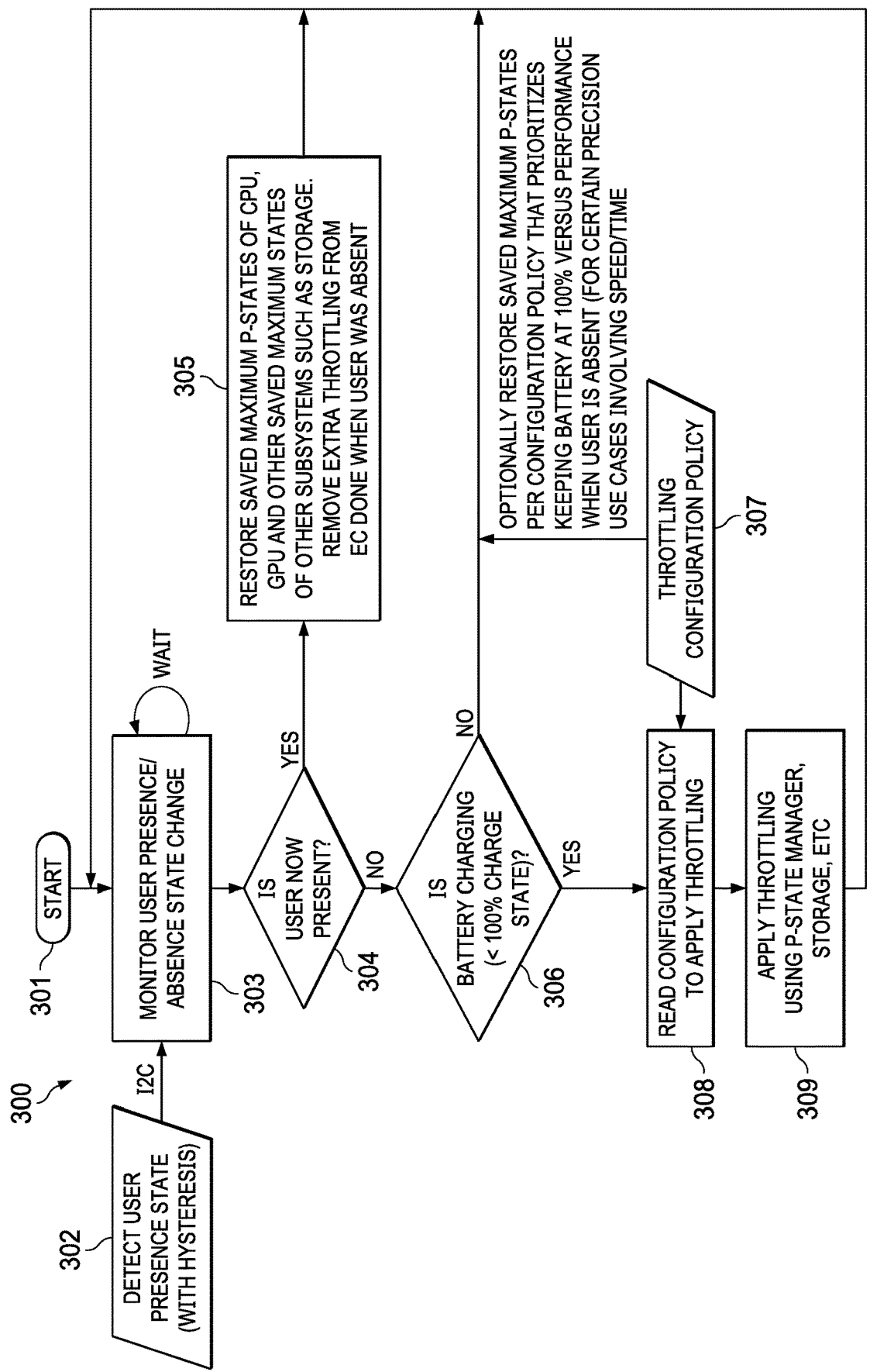
FIG. 3 is a flowchart illustrating an example of a method for increasing or maximizing battery charging based upon presence/absence/distance detection, according to some embodiments.

FIG. 3 is a flowchart illustrating an example of method 300 for increasing or maximizing battery charging based upon presence/absence/distance detection. In some embodiments, method 300 may be performed by battery and performance manager 201 under execution by CPU 12 and/or EC 18. Particularly method 300 starts at block 301. At block 302, method 300 detects the user's presence state with respect to an IHS (e.g., with a hysteresis mechanism to prevent quick oscillations between states). At block 303, method 300 monitors presence state changes (e.g., between present, near-field, mid-field, far-field, and/or absent). If no change is detected, block 303 waits.

Otherwise, at block 304, method 300 determines if the user is present. If so, block 305 restores the maximum p-states and/or operating frequencies of selected IHS components, such as a CPU, GPU, and storage systems— removes extra throttling from the IHS's EC previously performed when the user was absent—re control returns to block 303.

Conversely, if block 304 determines that the user is absent, block 306 evaluates whether the battery is presently charging (e.g., charge state<100%), for example, by collecting data from the IHS's BMU. Optionally, block 307 may provide a throttling configuration policy that restores saved maximum p-states to prioritize keeping the battery at 100% to the detriment of performance, for example, when the user is absent (increasing charging speed and/or time precision). At block 308, method 300 reads a configuration policy from block 307, and at block 309 method 300 applies performance throttling selected based upon the user's presence state, for instance, using a power-state manager, storage subsystem, etc. before control returns to block 303.

Figure 4:
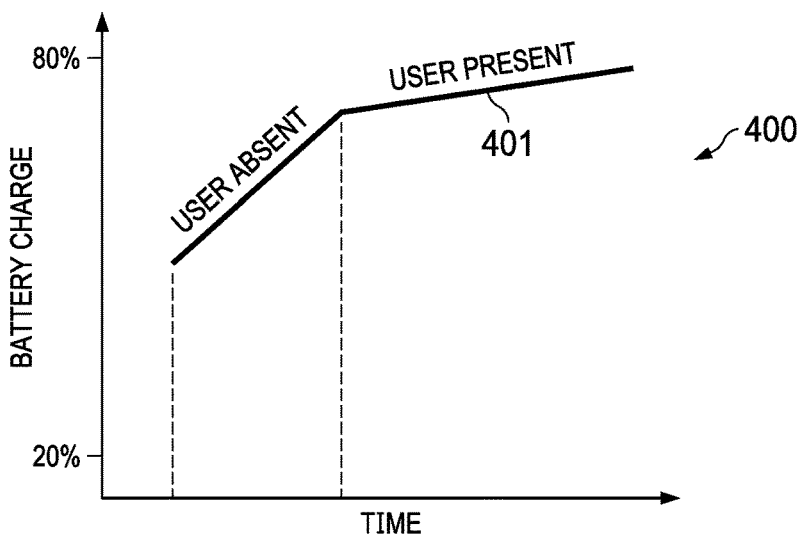
FIG. 4 is a graph illustrating an example of a battery charging curve, according to some embodiments.

FIG. 4 shows graph 400 illustrating an example of a battery charging curve resulting from the application of method 300, according to some embodiments. Particularly, when the user is at first absent, battery charge curve 401 indicates that the battery charges with a first upward slope or charging rate (a more strict performance throttling is selected), and later when the user is present the battery charges with a second upward slope or charging rate that is smaller or slower than the first slope or rate (a less strict performance throttling applies).

Still as part of CBM, another important use-case involves maximizing the amount of time the IRS's battery has left in DC mode as much as possible. Particularly, it is important to maximize the battery metric (DC time left-to-empty charge) for a targeted runtime when the user is determined to be absent from a mobile IHS.

In a mobile IHS operating in DC mode, battery discharge time-to-empty is generally a function of p-state manager, turbo states, applications being executed, etc. In some embodiments, a software service on the IHSs EC may use ISH presence/absence/distance detection along with other ISH information to contextually increase or maximize battery time-to-empty charge in DC mode by using a function set by a configuration policy to lookup and set a performance level (i.e., a performance throttling level) as a function of battery leftover time-to-empty. Based on the function, throttling of CPU, GPU to lower p-states can be done, also leveraging other existing throttling mechanisms such as storage power management, etc., to contextually trade off responsiveness and performance for maximum battery time-to-empty discharge, along with maximum throttling level when the user is absent.

In an embodiment, a software service may implement a configuration policy that takes user presence or absence states as a binary input and reduces or minimizes battery discharging as a binary output. In other implementations, maximum clock values or power levels for various IHS components may be selected in response to the user's physical distance from the IHS in a discrete (e.g., near, mid, or far-field) or continuous (e.g., inversely proportional to distance) fashion as part of a CBM engine. An alternative embodiment may include an OS service that reads context SDK output to determine user presence, reads the configuration policy and current battery leftover time to empty, then applies a graded level of OS modes for throttling using OS APIs to maximize battery leftover-to-empty in DC mode, when user is absent.

As such, these systems and methods may adaptively switch between performance mode (responsiveness, latency, raw throughput performance etc.) and power mode (faster charging) in DC mode based on the user being contextually absent (or present but farther away) from the IHS. In some implementations, these systems and methods may also incorporate machine learning elements.

Figure 5:
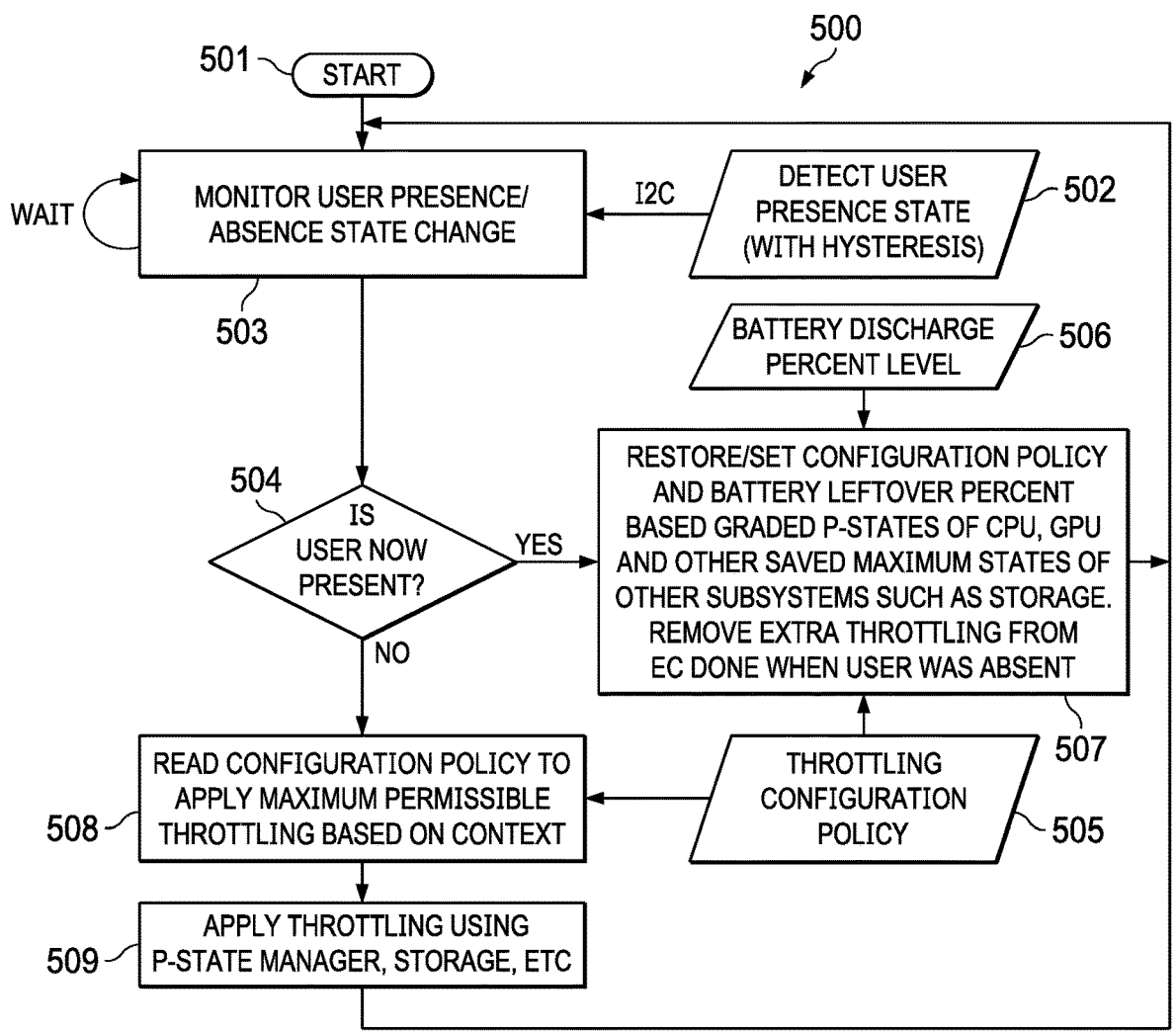
FIG. 5 is a flowchart illustrating an example of a method for reducing or minimizing battery discharging based upon presence/absence/distance detection, according to some embodiments.

FIG. 5 is a flowchart illustrating an example of a method for reducing or minimizing battery discharging (that is, increasing or maximizing battery time-to-empty charge) based upon presence/absence/distance detection. In some embodiments, method 500 may be performed by battery and performance manager 201 under execution by CPU 12 and/or EC 18. Particularly method 500 starts at block 501. At block 502, method 500 detects the user's presence/absence/distance with respect to an IHS (e.g., with a hysteresis mechanism to prevent quick oscillations between states). At block 503, method 500 monitors presence state changes (e.g., between present, near-field, mid-field, far-field, and/or absent). If no change is detected, block 503 waits.

Otherwise, at block 504, method 500 determines if the user is present. If so, block 505 retrieves the applicable throttling configuration policy 505 corresponding to the presence state as well as the current battery discharge level (% of full), and it restores or sets the maximum p-states and/or operating frequencies of selected IHS components, such as the CPU, GPU, and/or storage systems—and removes extra throttling from the IHS's EC previously performed when the user was absent—before control returns to block 503.

Conversely, if block 504 determines that the user is absent, block 508 reads a throttling configuration policy that applies the maximum permissible levels of performance throttling based upon context. At block 509, method 500 applies the selected level of throttling based upon the user's presence state, for example, using a power-state manager, storage subsystem, etc. before control returns to block 503.

In embodiments where block 502 identifies a distance between the user and the IHS, block 509 may apply different maximum turbo, clock, and/or p-state values depending upon whether the user is found in the IHS's near-field, mid-field, or far-field—that is, even when the user is present. For example, block 509 may select a first maximum turbo frequency in response to the user being in the near-field; a second maximum turbo frequency smaller than the first maximum turbo frequency in response to the user being in the mid-field; or a third maximum turbo frequency smaller than the second maximum turbo frequency in response to the user being in the far-field. In other implementations, the second maximum turbo frequency may be greater than the first maximum turbo frequency in response to the user being in the mid-field; or a third maximum turbo frequency may be greater than the second maximum turbo frequency in response to the user being in the far-field. Additionally, or alternatively, the aforementioned first, second, and third maximum turbo frequencies may be scaled up or down using multiplication factor(s) selected based upon to the IHS's context (e.g., directly proportional to an angle of a hinge between a display and a keyboard portion of an IHS) and/or battery level (e.g., smaller multiplication factor for smaller battery charge levels).

Figure 6A:
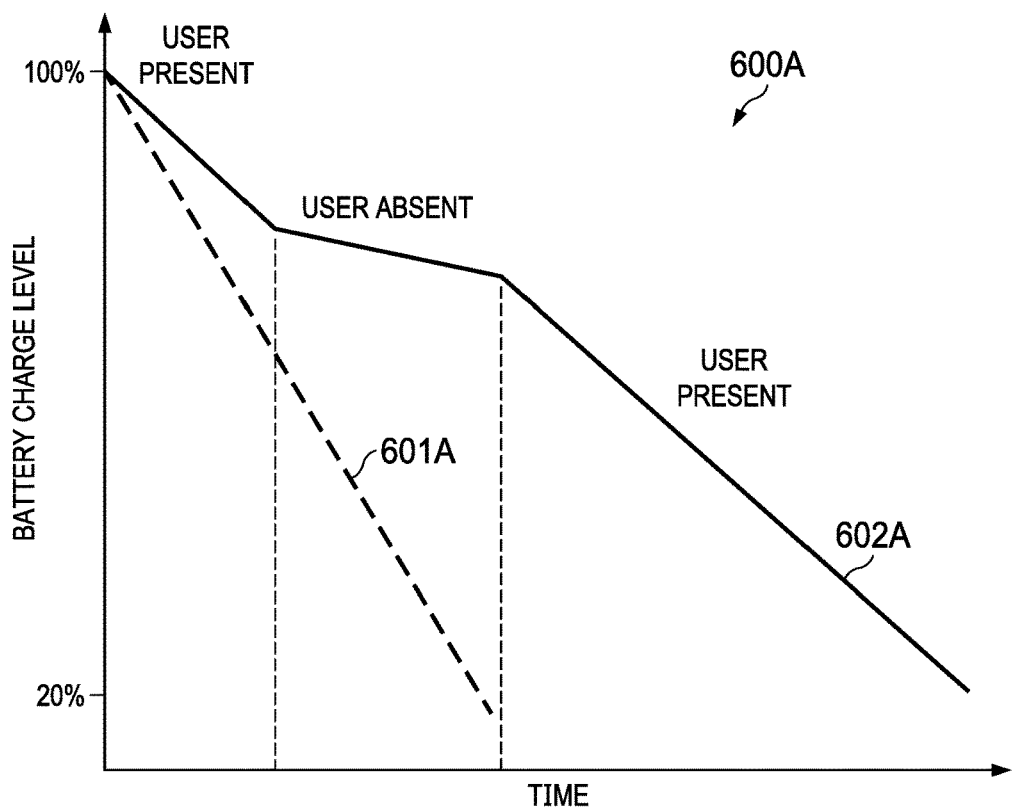
FIGS. 6A and 6B are graphs illustrating examples of battery discharge and performance throttling curves, respectively, according to some embodiments.
Figure 6B:
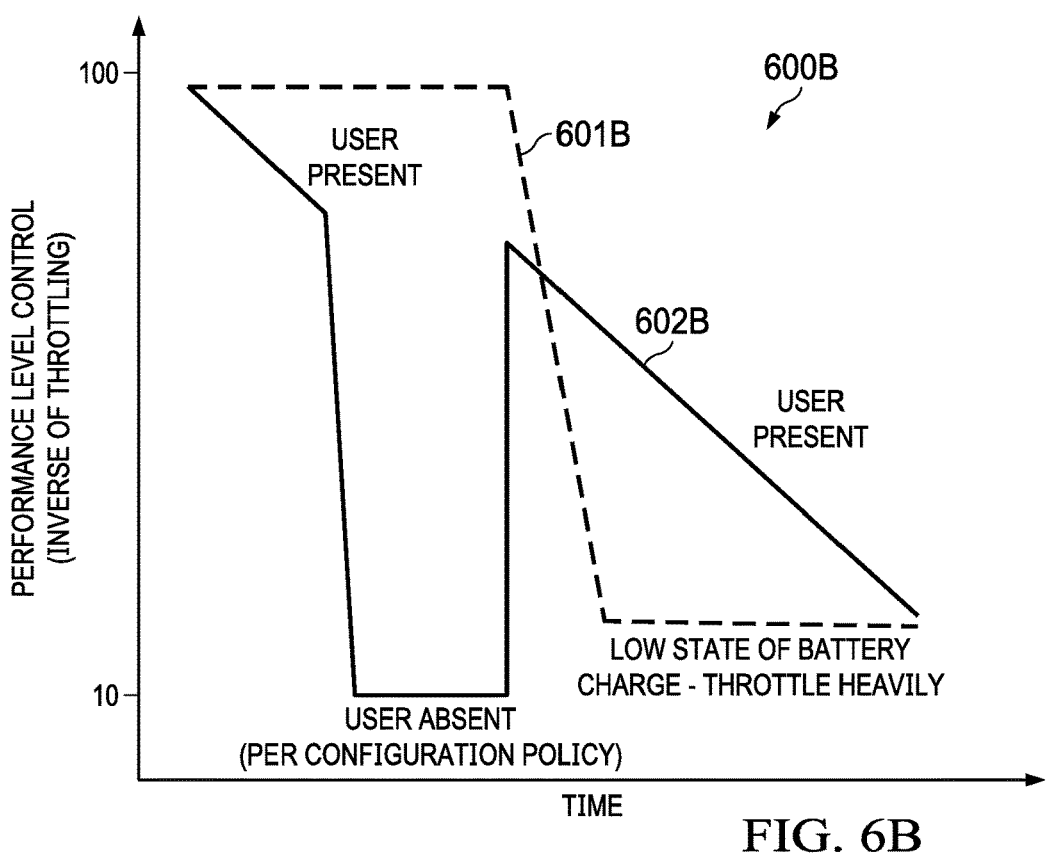

FIGS. 6A and 6B show graphs 600A and 600B illustrating examples of battery discharge curves and performance throttling curves according to some embodiments. As noted above, systems and methods described herein may enable graded performance throttling as a function of remaining battery life in DC mode combined with full performance throttling per configuration policy when the user is absent in DC mode (that is, performance level is a function of battery charge level and configuration policy). As such, these techniques may extend battery throttling performance before the battery charge reaches a low level, if the user is absent.

Particularly, with respect to graph 600A of FIG. 6A, curve 601A shows a linear discharge of the battery with the same slope regardless of user presence when method 500 is not applied. In contrast, curve 602A shows a discharge of the battery when the user is initially present with a first down slope or discharge rate, followed by a period of time when the user is absent with a second down slope or discharge rate, and then finally again with the same first down slope or discharge rate when the user is present before the IHS. The second down slope or discharge rate (user is absent) is smaller or slower than the first and third down slopes or discharge rates (user is present).

Graph 600B of FIG. 6B accompanies graph 600A of FIG. 6A and it shows the IHS's performance level (inverse of throttling) over time. Particularly, curve 601B follows curve 601A and it shows that no performance control is applied in the beginning of that same session, until the battery crosses a selected threshold charge level ("low state of charge"), after which point very aggressive throttling is applied. In contrast, curve 602B follows curve 602A and it shows that throttling increases while the user is present with a given slope or rate, but when the user is absent the applicable configuration policy applies heavy (and constant) throttling settings. When the user eventually returns to the IHS, the previous throttling level (when the user was last present) is recovered and it continues to increase with the same given slope or rate.

Still as part of CBM, in the case of an undersized AC adapter where the IHS is in AC non-performance mode, systems and method described herein may enable best performance by using the battery to support power demand that exceed the AC adapter's capacity, and monitor the battery's state of charge to ensure that sufficient reserve energy is maintained to support runtime if the user unplugs the AC adapter. Additionally, these systems and method may employ graded throttling if the battery SOC charge levels fall below a selected threshold with the user present, leverage user absence to maximize performance throttling.

In an undersized AC adapter situation, an IHS draws more power from its battery during peak events than it normally would. However, in some cases the systems and methods described herein may not trigger charging of the battery (which is not possible in DC mode) unless the state of charge drops below a selected level x %. Additionally, the throttling level may be a function of the battery's state of charge, with maximum throttling set when the user is absent.

In some embodiments, a software service on the EC may enable improved or best performance in the case of an undersized AC adapter using a battery state of charge (e.g., % below threshold "x") to trigger charging, ISH presence/absence/distance detection along with other ISH information, configuration policy for graded throttling level in AC mode by setting p-states to graded values as a function of state of charge, and/or maximum throttling level when user is absent or farther away.

As such, systems and methods described herein may adaptively mitigate for undersized adapter in AC mode while preserving battery longevity as well as runtime in peak performance scenarios using a combination of charge trigger above threshold of state of charge, graded throttling, and user absence to increase or maximize performance throttling.

Figure 7:
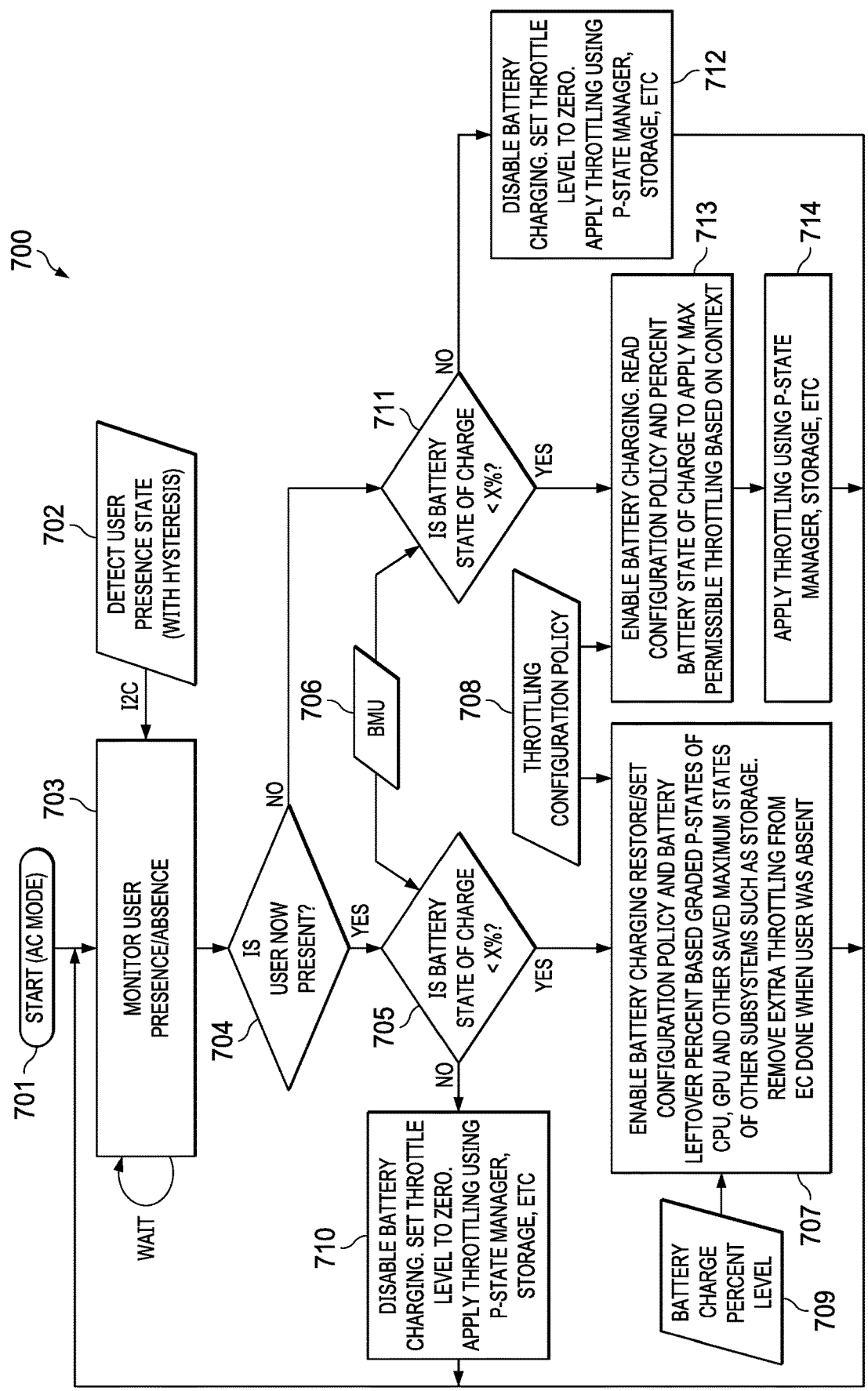
FIG. 7 is a flowchart illustrating an example of a method for reducing or minimizing battery discharging subject to undersized power adapters based upon presence/absence/distance detection, according to some embodiments.

FIG. 7 is a flowchart illustrating an example of method 700 for reducing or minimizing battery discharging subject to undersized power adapters based upon presence/absence/ distance detection, according to some embodiments. In some embodiments, method 700 may be performed by battery and performance manager 201 under execution by CPU 12 and/or EC 18. Particularly, method 700 starts at block 701. At block 702, method 700 detects the user's presence state with respect to an IHS (e.g., with a hysteresis mechanism to prevent quick oscillations between states). At block 703, method 700 monitors presence state changes (e.g., between present, near-field, mid-field, far-field, and/or absent). If no change is detected, block 703 waits.

Otherwise, at block 704, method 700 determines if the user is present. If so, block 705 collects BMU data 706 and determines whether the battery state of charge is smaller than a selected threshold value (<x %). If so, block 707 retrieves a throttling configuration policy 708 and battery charge level 709, and enables battery charging by restoring/setting a configuration policy and battery leftover % based on graded p-states of CPU and/or GPU, and saved maximum states of storage subsystems, etc., and it removes extra throttling from the EC previously set when the user was absent; before control returns to block 703. Conversely, if block 705 determines that the battery state of charge is not smaller than x %, block 710 disables battery charging, sets throttle level to zero, and applies throttling using a p-state manager, storage subsystem, etc.

When block 704 determines that the user is not present, block 711 collects BMU data 706 and determines whether the battery state of charge is smaller than a selected threshold value (<x %). If so, block 713 receives throttling configuration policy 708, enables battery charging, and reads the configuration policy and battery state of charge to select a maximum permissible throttling based on context. Block 714 then applies the selected throttling using the p-stage manager, storage subsystem, etc. before control returns to block 703. Conversely, if block 711 determines that the battery state of charge is not smaller than x %, block 712 disables battery charging, sets throttle level to zero, and applies throttling using the p-state manager, storage subsystem, etc., before control returns to block 703.

In embodiments where block 702 identifies a distance between the user and the IHS, block 714 may apply different maximum turbo, clock, and/or p-state values depending upon whether the user is found in the IHS's near-field, mid-field, or far-field—that is, even when the user is present. For example, block 713 may select a first maximum turbo frequency in response to the user being in the near-field; a second maximum turbo frequency smaller than the first maximum turbo frequency in response to the user being in the mid-field; or a third maximum turbo frequency smaller than the second maximum turbo frequency in response to the user being in the far-field. In other implementations, the second maximum turbo frequency may be greater than the first maximum turbo frequency in response to the user being in the mid-field; or a third maximum turbo frequency may be greater than the second maximum turbo frequency in response to the user being in the far-field. Additionally, or alternatively, the aforementioned first, second, and third maximum turbo frequencies may be scaled up or down using multiplication factor(s) selected based upon to the IHS's context (e.g., directly proportional to an angle of a hinge between a display and a keyboard portion of an IHS) and/or battery level (e.g., smaller multiplication factor for smaller battery charge levels).

Figure 8A:
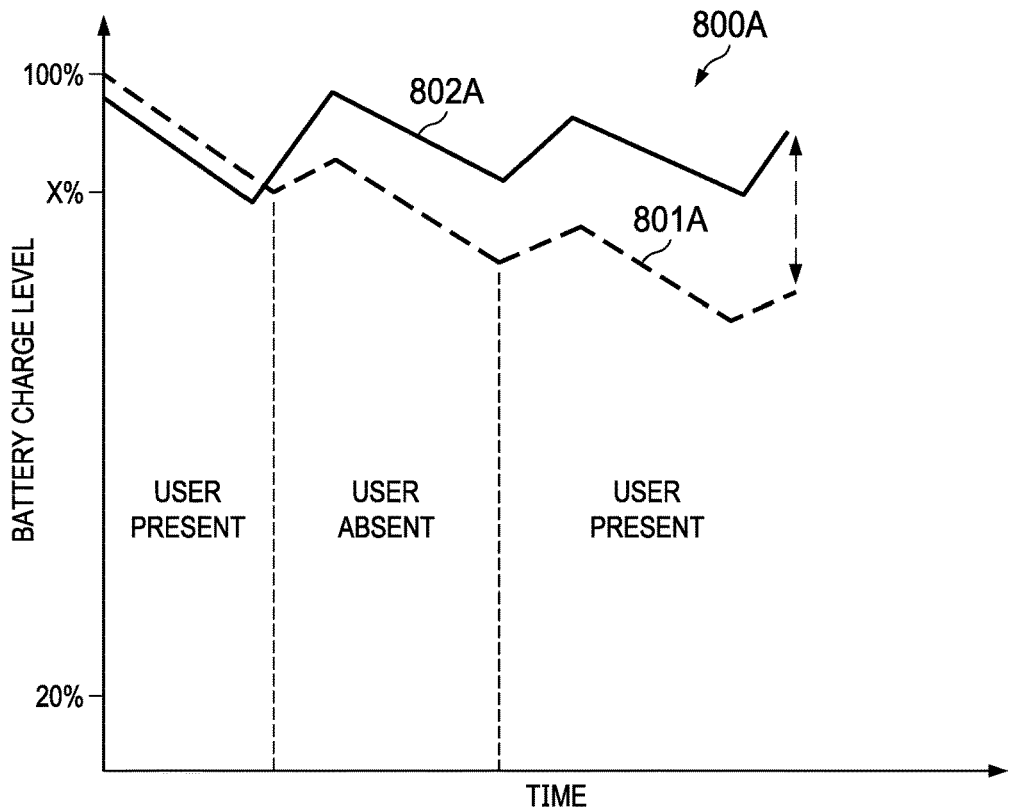
FIGS. 8A and 8B are graphs illustrating examples of battery discharge and performance throttling curves, respectively, according to some embodiments.
Figure 8B:
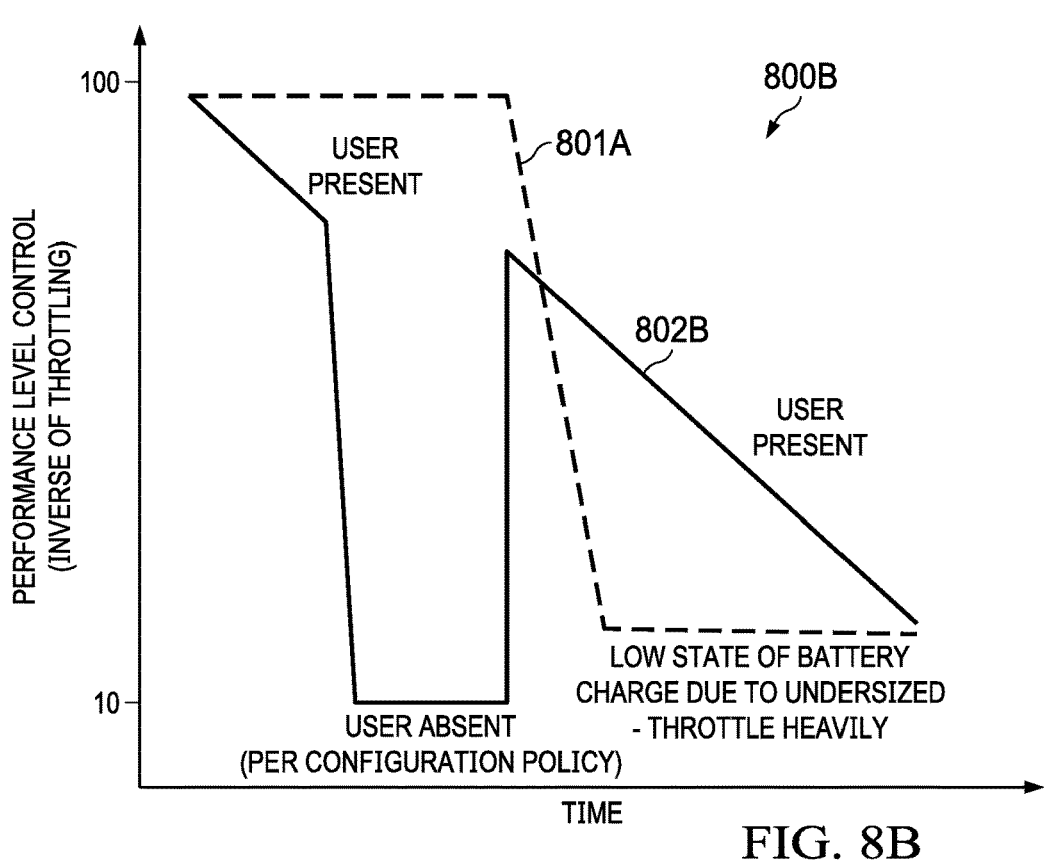

FIGS. 8A and 8B show graphs 800A and 800B illustrating examples of battery discharge and performance throttling curves according to some embodiments. As noted above, systems and methods described herein may, for an IHS in non-performance mode with an undersized adapter, starting at 100% battery charge: (a) not charge up the battery unless state of charge drops below x %, (b) apply graded throttling between x % and 0% using learned configuration policy lookup for the SOC or IHS component versus throttling level, and/or (c) when user is absent, apply the maximum performance throttling.

Particularly, with respect to graph 800A of FIG. 8A, curve 801A shows a discharge of the battery that oscillates but generally declines past a threshold x % charge level when method 700 is not applied. Curve 802A assumes that the battery starts at 100%. An undersized AC adapter or power source cannot keep up with peak turbo events, so the battery loses charge over time in AC mode. In contrast, curve 802A shows the same type of oscillation but the battery level never drops below x %, while accounting for different user's presence states. Curve 802A assumes that the battery starts at 98% (x %) and that it keeps up a better state of charge with peak turbo events in AC mode. The divergence or vertical gap between curves 801A and 802A shows that the battery is better preserved when method 700 is applied with the same usage, and the overall slope of discharge and charge for curve 802A is higher than for curve 801A.

Graph 800B of FIG. 8B accompanies graph 800A of FIG. 8A and it shows the IHS's performance level (i.e., the inverse of throttling) over time. Particularly, curve 801B follows curve 801A and it shows that no performance control is applied in the beginning of that same session, until the battery crosses a selected threshold charge level ("low state of charge"), after which point very aggressive throttling is applied. In contrast, curve 802B follows curve 802A and it shows that throttling increases while the user is present with a given slope or rate, but when the user is absent the applicable configuration policy applies heavy (and constant) throttling settings. When the user eventually returns to the IHS, the previous throttling level (when the user was last present) is recovered and it continues to increase with the same given slope or rate.

Still as part of CBM, existing methods for battery runtime extension traditionally follow a one-size-fits-all policy (e.g., "battery saver mode" in WINDOWS 10 or "battery extension mode" in DCPM. In contrast, in systems and methods described herein, battery and performance manager 201 may customize policies based on a user profile determination (e.g., "desktop replacement" vs. "corridor warrior," etc.). Furthermore, after applying user profiles, battery and performance manager 201 may dynamically change a policy based upon context. For instance, if a corridor warrior is in a meeting and away from the IHS (e.g., presenting on a white board), battery and performance manager 201 may change the policy to aggressively reduce the LCD brightness.

In some embodiments, battery and performance manager 201 may use cumulative data from a BMU and a trained machine learning (ML) model to classify the user profile in one of N classes (e.g., "desktop replacement," "corridor warrior," "marathon user," "home media user," etc.) depending upon a history of usage of the IHS. A mapping of user profiles and user presence states may be created to apply during runtime. Such mapping adaptively reduces the IHS's p-state to balance the user experience and performance versus runtime. For example, a user in the IHS's near-field may receive policies that gracefully reduce LCD brightness and maximum clock frequencies of selected IHS components, whereas the same type of user in the IHS's far-field may receive large reductions in LCD brightness and maximum clock frequencies, automatic light sensing (ALS) and/or other features may be turned off, etc.

Figure 9:
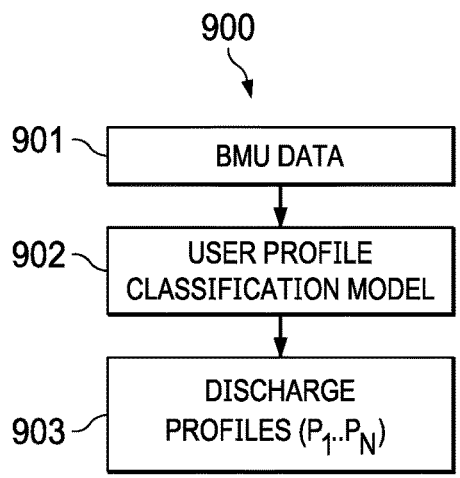
FIG. 9 is a flowchart illustrating an example of a method for user profile detection, according to some embodiments.

FIG. 9 is a flowchart illustrating an example of method 900 for user profile detection. In some embodiments, method 900 may be performed by battery and performance manager 201 under execution by CPU 12 and/or EC 18. Particularly, at block 901 method 900 receives BMU data of historical battery usage, charge levels, runtime duration, charge and discharge frequencies, number or frequency of discharge events below a selected threshold (e.g., 30%), etc. Then, at block 902, method 900 applies a profile classification model, for example, comparisons, machine learning, and/or artificial intelligence routines to classify the user/IHS, based upon the BMU data, as a predefined one of: "desktop replacement," "corridor warrior," "marathon user," "home media user," etc. Then, at block 903, method 900 may provide one or more battery discharge profiles (P1, . . . , $P_N$). Examples of battery discharge profiles are shown in Table I below:

TABLE 1

|  | Profile 1 (Desktop Replacement) | Profile 2 (Marathon User) | Profile 3 | . . . | Profile N |
| --- | --- | --- | --- | --- | --- |
| User in near-field | Default battery saver policy | Default battery saver policy | . . . | . . . | . . . |
| User in mid-field | Default battery saver policy | Enhanced power saver mode | . . . | . . . | . . . |
| User in far-field | Enhanced power saver mode | Enhanced power saver mode | . . . | . . . | . . . |
| User Absent | Aggressive power save mode | Aggressive power saver mode | . . . | . . . | . . . |

In Table I, the terms "default," "enhanced," and "aggressive" correspond to progressively increasing levels of IHS throttling applied via stricter IHS settings (e.g., less turbo, more dimming, etc.).

Figure 10:
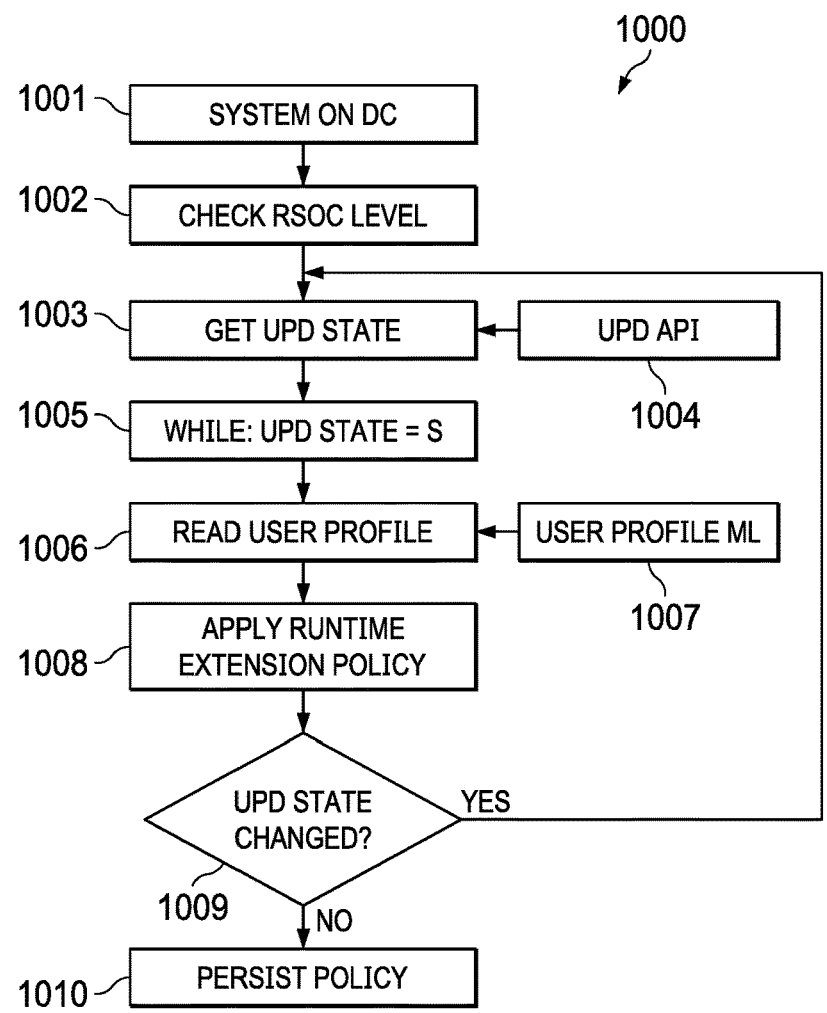
FIG. 10 is a flowchart illustrating an example of a method for applying a runtime extension policy involving presence/absence/distance detection, according to some embodiments.

FIG. 10 is a flowchart illustrating an example of a method for applying a runtime extension policy involving presence/absence/distance detection. In some embodiments, method 1000 may be performed by battery and performance manager 201 under execution by CPU 12 and/or EC 18 during runtime. Particularly, at block 1001, method 1000 determines that the IHS is operating in DC mode (i.e., without an AC power adaptor plugged in). At block 1002, method 1000 checks the battery charge level 1002. Then, at block 1003, method 1000 determines a user presence (UPD) state using UPD API 1004.

Block 1005 provides loop control that maintains method 1000 executing so long as the UPD state is being received. At block 1006, method 1000 reads a user profile (e.g., one of the profiles described in Table I) from machine learning module 1007. At block 1008, method 1000 applies a selected runtime extension policy. Block 1009 determines whether the UPD state has changed; if so, control returns to block 1005—otherwise block 1010 causes the selected policy to persist.

Still as part of CBM, collecting BMU data from an IHS in the field can affect IHS resources, and may be disruptive to end-user experience as a result. To address this, systems and methods describe herein may collect BMU data when the IHS is not in modern standby and is actually running, but user appears determined to be absent from the IHS based on context (e.g., present/absence/distance, hinge angle, etc.). In other implementations, the frequency of data collection and/or the number of attributes collected may be directly proportional to the user's distance from the IHS (near-field, mid-field, or far-field). As such, these systems and methods may adaptively manage BMU data collection in a way that does not impact user experience due to resources expended at collection by executing in response to the user being absent and/or farther away from the IHS.

Figure 11:
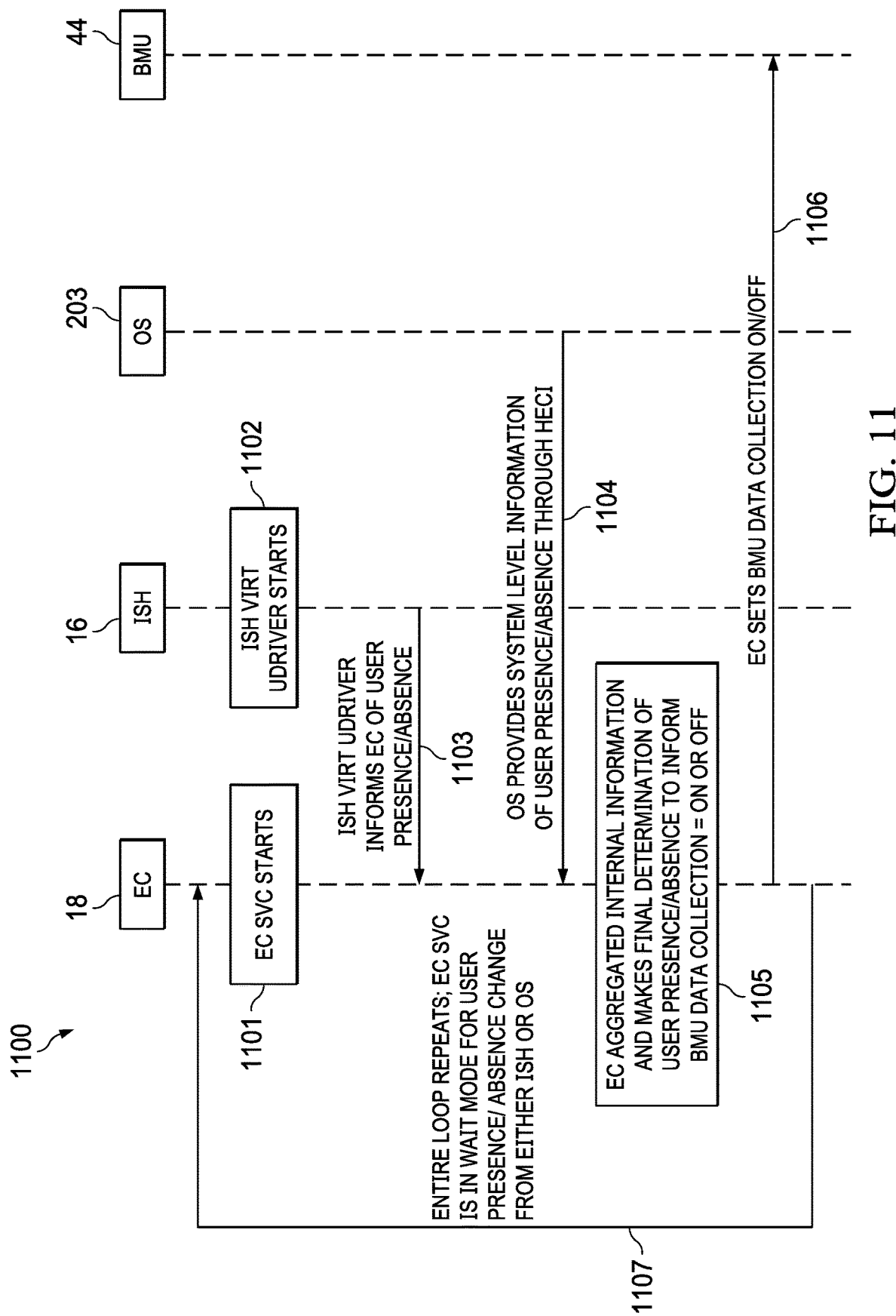
FIG. 11 is a diagram illustrating an example of a method for collecting Battery Management Unit (BMU) data using presence/absence/distance detection, according to some embodiments.

FIG. 11 is a diagram illustrating an example of method 1100 for collecting Battery Management Unit (BMU) data using presence/absence/distance detection. In various embodiments, method 1100 may be performed by battery and performance manager 201 under execution by CPU 12 and/or EC 18 and with cooperation of chipset 16 (e.g., an ISH component or virtual microdriver) and BMU 44. In this implementation, battery and performance manager 201 is configured to determine whether to enable or disable BMU data collection.

Particularly, at 1101 an EC service starts execution, and at block 1102 an ISH virtual microdriver starts execution. At 1103, ISH 16 informs EC 18 of the user presence status (e.g., present or absent), for example, using hardware sensors through I2C directly or through a BIOS Advanced Configuration and Power Interface (ACPI) mechanism. Additionally, or alternatively, at 1104, OS 203 independently provides software level information of user presence/absence (e.g., a period of input inactivity above a threshold indicating absence; hinge angle above or below a threshold indicating presence and absence, respectively; a battery charging mode, etc.) to EC 18 through a Host Embedded Controller Interface (HECI).

At 1105, EC 18 aggregates the presence information received from ISH 16 and/or OS 103 and makes a final determination of user presence/absence/distance. Then, at 1106, EC 18 enables/disables BMU data collection through an EC-BMU interface. Alternatively, OS 203 may make the final determination of BMU data collection on/off, which then communicates with EC to turn on/off the data collection in BMU.

In some cases, rather than binarily enabling/disabling BMU data collection, method 1100 may throttle the data collection process in manner proportional to the user's distance from the IHS (e.g., maximum BMU data collection when the user is absent, more BMU data collection when the user is in the far-field, less BMU data collection when the user is in the mid-field, and no collection when the user is in the near-field). Finally, at 1107, method 1100 repeats and EC 18 waits for user presence/absence/distance change from ISH 16 and/or OS 203.

Still as part of CBM, collection of data from other IHS components and SOCs (e.g., CPU, GPU, etc.) typically relies on precise event driven or synchronous timing achieved using System Management Interrupts (SMIs) and System Management Mode (SMM). A problem with SMIs to trigger SMM functionality is that is can be detrimental to the overall user experience due to the running of non-interruptible non-maskable code that negatively affects userspace code being executed (e.g., applications, etc.). To address this issue, systems and methods described herein provide the ability to collect precise data using SMIs/SMMs, without impacting the user's experience. These systems and methods may adaptively manage critical synchronous or asynchronous SOC data collection in a way that does not impact user experience due to resources expended at collection by doing it when user is absent and/or farther away from the IHS.

FIG. 12 is a diagram illustrating an example of a method for collecting other IHS component data using presence/absence/distance detection. In various embodiments, method 1200 may be performed by battery and performance manager 201 under execution by CPU 12 and/or EC 18 and with cooperation of chipset 16 (e.g., an ISH component or virtual microdriver) and BIOS 18. In this implementation, battery and performance manager 201 is configured to enable BIOS 18 to make a final determination of whether to enable or disable SMI/SMM data collection.

Particularly, at 1201, an EC service starts execution and loads a configuration policy, while at block 1202 an ISH virtual microdriver starts execution. At 1203, a data collector agent makes an SMI/SMM request from BIOS 18. At 1204, ISH 16 informs EC 18 of the user presence status (e.g., present or absent), for example, using hardware sensors through I2C directly or through a BIOS ACPI mechanism. Additionally, or alternatively, at 1205, OS 203 independently provides software level information of user presence/absence/distance (e.g., a period of input inactivity above a threshold indicating absence; hinge angle above or below a threshold indicating presence and absence, respectively; a battery charging mode, etc.) to EC 18 through a Host Embedded Controller Interface (HECI). In some cases, OS 203 may also provide an initial configuration policy to EC 16.

At 1206, EC 18 aggregates the presence information received from ISH 16 and/or OS 103 and makes a final determination of user presence/absence/distance, for example, to generate a JavaScript Object Notation (JSON) file. At 1207, BIOS 18 may request EC 18 for a list of permissible SMI/SMMs following the applicable policy. In response, at 1208, EC 18 communicates JSON with a set of allowed SMI/SMM events to BIOS 18. Then, at 1109, BIOS 18 makes a final determination to allow or disallow SMI/SMM requests from the data collector agent.

Alternatively, method 1200 may throttle the data collection process in manner proportional to the user's distance from the IHS (e.g., maximum BMU data collection when the user is absent, more SMI/SMM data collection when the user is in the far-field, less SMI/SMM data collection when the user is in the mid-field, and no collection when the user is in the near-field). Finally, at 1210, method 1200 repeats and EC 18 waits for user presence/absence/distance change from ISH 16 and/or OS 203.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
receiving a first amount of energy from a power source directed to supporting operation of an Information Handling System (IHS);
receiving a second amount of energy from the power source directed to charging a battery of the IHS;
determining a user's presence state with respect to the IHS;
modifying the first and second amounts in response to the presence state;
determining that the power source is disconnected;
determining a battery runtime to empty charge; and
applying a performance throttling profile to the IHS based upon a target battery runtime, wherein the profile is selected in response to the battery runtime to empty charge.

2. The method of claim 1, wherein the power source comprises an alternating current (AC) adapter, a Universal Serial Bus Type-C (USB-C) device, or an induction charging pad.

3. The method of claim 1, wherein the user's presence state is selected from the group consisting of: present or absent.

4. The method of claim 1, wherein the performance throttling profile is based upon a type of user, and wherein the performance throttling profile includes different IHS settings selected depending upon whether the user's presence state is determined to be: near-field, mid-field, or far-field.

5. The method of claim 1, further comprising:
in response to the user being present with respect to the IHS and a level of the battery dropping below a selected threshold, increasing the second amount and decreasing the first amount at a first rate; and
in response to the user being absent with respect to the IHS and the level of the battery dropping below the selected threshold, increasing the second amount and decreasing the first amount at a second rate higher than the first rate.

6. The method of claim 1, further comprising:
in response to the user being present with respect to the IHS, setting a rate of data collection from an IHS component at a first rate; and
in response to the user being absent with respect to the IHS, setting the rate of data collection at a second rate higher than the first rate.

7. The method of claim 3, wherein the user is absent, and wherein modifying the first and second amounts comprises increasing the second amount and decreasing the first amount.

8. The method of claim 3, wherein the user is present, and wherein modifying the first and second amounts comprises increasing the first amount and decreasing the second amount.

9. The method of claim 3, wherein the presence state is selected from the group consisting of: near-field, mid-filed, and far-field.

10. The method of claim 6, wherein the IHS component comprises a Battery Management Unit (BMU) or a Central Processing Unit (CPU).

11. The method of claim 7, further comprising at least one of: reducing a maximum clock speed of a component of the IHS, placing a component of the IHS in standby, turning off a component of the IHS, dimming a component of the IHS, or shutting down an executed application.

12. The method of claim 8, further comprising at least one of: increasing a maximum a clock speed of a component of the IHS, removing a component of the IHS from standby, turning on a component of the IHS, or brightening a component of the IHS.

13. The method of claim 9, wherein the user is present, and wherein modifying the first and second amounts comprises increasing the second amount and decreasing the first amount at a rate proportional to the user's distance from the IHS.

14. An Information Handling System (IHS), comprising:
a processor; and
a memory coupled to the processor, the memory having program instructions stored thereon that, upon execution by the processor, cause the IHS to:
receive a first amount of energy from a power source directed to supporting operation of the IHS;
receive a second amount of energy from the power source directed to charging a battery of the IHS;
determine a user's presence state with respect to the IHS, wherein the user's presence state is selected from the group consisting of: near-field, mid-filed, and far-field; and
increase the second amount and decrease the first amount at a rate proportional to the user's presence state.

15. The IHS of claim 14, wherein the program instructions, upon execution by the processor, cause the IHS to:
determine that the power source is disconnected;
determine a battery runtime to empty charge; and
apply a performance throttling profile to the IHS based upon a target battery runtime, wherein the profile is selected in response to the battery runtime to empty charge.

16. The IHS of claim 15, wherein the program instructions, upon execution by the processor, cause the IHS to:
in response to a level of the battery dropping below a selected threshold, increase the second amount and decrease the first amount at a first rate.

17. A memory storage device having program instructions stored thereon that, upon execution by one or more processors of an Information Handling System (IHS), cause the IHS to:
determine that a battery of the IHS is expected to undergo a charge event;
modify a setting of the IHS to reduce a power consumption of the IHS in anticipation of the charge event;
determine that a power source is disconnected; and
apply a performance throttling profile to the IHS based upon a target battery runtime, wherein the profile is selected using a battery runtime to empty charge.

18. The memory storage device of claim 17, wherein the program instructions, upon execution, further cause the IHS to:
in response to the user being present with respect to the IHS and a level of the battery dropping below a selected threshold, increase the second amount and decrease the first amount at a first rate; and
in response to the user being absent with respect to the IHS and the level of the battery dropping below the selected threshold, increase the second amount and decrease the first amount at a second rate higher than the first rate.

\* \* \* \* \*